United States Patent [19]

Philipsen

[11] 4,225,793
[45] Sep. 30, 1980

[54] ARRANGEMENT FOR MONITORING A CURRENT NETWORK

[75] Inventor: Horst Philipsen, Elmshorn, Fed. Rep. of Germany

[73] Assignee: Ad. Strüver KG (GmbH & Co.), Hamburg, Fed. Rep. of Germany

[21] Appl. No.: 923,294

[22] Filed: Jul. 10, 1978

[30] Foreign Application Priority Data

Jul. 9, 1977 [DE] Fed. Rep. of Germany ... 7721674[U]
Jan. 30, 1978 [DE] Fed. Rep. of Germany ....... 2803966

[51] Int. Cl.² .............................................. H02J 9/08
[52] U.S. Cl. ..................................................... 307/68
[58] Field of Search ....................... 307/64, 65, 68, 23, 307/129, 150; 290/30 R, 30 A, 30 B, 4 R; 361/23

[56] References Cited

U.S. PATENT DOCUMENTS

| | | | |
|---|---|---|---|
| 2,920,211 | 1/1960 | Gotoh | 290/30 B X |
| 3,529,215 | 9/1970 | Xavier et al. | 307/129 X |
| 3,558,911 | 1/1971 | Chen | 307/129 |
| 3,609,426 | 9/1971 | Gaul | 290/30 A X |
| 3,967,132 | 6/1976 | Takamine | 290/30 R X |
| 3,970,897 | 7/1976 | Tomis et al. | 361/23 |

Primary Examiner—L. T. Hix
Assistant Examiner—James L. Dwyer
Attorney, Agent, or Firm—Becker & Becker, Inc.

[57] ABSTRACT

An arrangement for monitoring a current network to which is connected at least one self-excited or separately excited three-phase synchronous machine which is operatively connected e.g. to a device which is in immediate readiness for operation and comprises an energy storage device, while between the neutral or star point of the three-phase synchronous machine and the neutral wire of the network a monitoring device is arranged for controlling the network master switch. The monitoring device includes an $M_P$-current converter, a load following the $M_P$-converter and a frequency relay. The frequency relay ascertains the zero axis crossings of the dropping voltage on the load. The drop of the zero axis crossing frequency below a preset value serves as a signal for a network failure and for the actuation of the network switch and/or for other switch operations desired in this connection.

8 Claims, 3 Drawing Figures

ARRANGEMENT FOR MONITORING A CURRENT NETWORK

The present invention relates to an arrangement for monitoring a current network to which is connected at least one self-excited or separately excited three-phase synchronous motor which is operatively connected to an immediately ready device with energy storage, while between the neutral or star point of the three-phase synchronous motor and the neutral wire there is arranged a controlling device for controlling the network switch.

For determining a power failure, customarily over- and under-voltage relays, frequency controls or power changing relays are employed. By means of these control instruments, a power failure can, however, not be registered when no consumer is connected between the test point and the power input point or when no emergency consumer load is connected to the network. Directly after the power failure of the network, the synchronous motor will, in the manner of a generator, feed current back into the network so that the failure cannot be determined during a longer phase of operation.

The network switch provided at the network input of the synchronous motor can thus not be switched off during this phase of operation so that return voltages will occur in the distributing network. These return voltages may represent a danger to human beings because in this connection the voltage passes onto the secondary side of the opened feed-in switches. During switch-on operations of these feed-in switches, furthermore short-circuits may occur inasmuch as the vector position of the synchronous motor may have slipped by a certain magnet wheel angle relative to that of the network.

In addition thereto, an arrangement for controlling a network has been described in German Auslegeschrift 12 57 264 according to which between the neutral point of the three-phase synchronous motor and the neutral wire a network monitoring device has been arranged. In this connection, during normal operation, the harmonic voltage which drops on a neutral point choke is ascertained according to the amount and is used for controlling a voltage relay which affects the network switch. For ascertaining the power failure, consequently the equalizing current flowing in the neutral wire of the network, preferably a current of the third harmonic, is made use of which at the neutral point choke generates a certain harmonic voltage. The evaluation of the harmonic component of the phase voltage is therefore extremely difficult if not impossible because the harmonic component of the phase voltage of the synchronous motor is dependent on the load cos $\phi$. Inasmuch as the load cos $\phi$ during operation of the motor can pass through the entire inductive and capacitive range, voltages of less than from 1 to 20% of the phase voltage may occur for the harmonic voltage. The neutral point choke interposed in the neutral wire will, in view of its inductive resistance, reduce the current of the higher harmonic component to a greater extent than that of the fundamental wave, whereby the harmonic voltage dropping on the choke will be further reduced. Due to this effect, a current evaluation will additionally be made more difficult during unfavorable load cos $\phi$. The installation of the neutral point choke furthermore requires considerable costs inasmuch as such an installation has always to be dimensioned for the maximum occuring inclined load (Schieflast), in the extreme case for the rated current of the synchronous motor.

Difficulties are additionally encountered when the network monitoring is effected with a parallel operation of synchronous motors inasmuch as after the power failure between the synchronous motors there may form an equalizing current of a higher harmonic. This may, above all, be expected when the parallel running synchronous motors have different proportions of the higher harmonic in their phase voltage. If pendulous motions occur between the parallel running synchronous motors, it is even possible with absolutely equal motor dimensions that periodic equalizing currents of a higher harmonic occur between the motors. Consequently, the precise determination of the power failure will, during parallel operation of synchronous motors, cause difficulties.

It is, therefore, an object of the present invention to provide an arrangement which will overcome the above mentioned difficulties and will permit a network monitoring by means of which the power failure can precisely be determined in spite of the absence of consumers and an emergency current consumer load.

It is a further object of this invention to permit a safe control of parallel running motors.

These and other objects and advantages of the invention will appear more clearly from the following specification in connection with the accompanying drawings, in which:

FIG. 4 shows a circuit including components to set forth more clearly the function and operation of the system in accordance with the teaching of the present invention.

Figure 1:
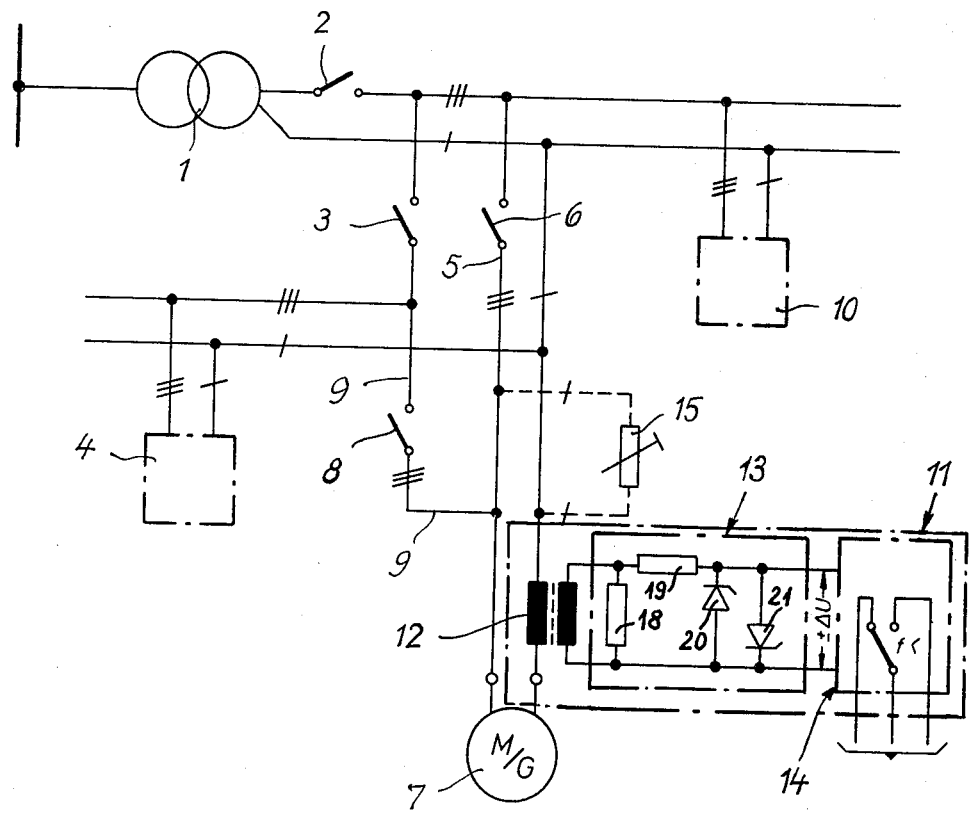
FIG. 1 shows a circuit of the control device according to the invention.

The monitoring arrangement according to the present invention is characterized primarily by an $M_P$-current converter, a next following load and a frequency relay, while the frequency relay ascertains the zero axis crossings of the voltage drop on the load, and is furthermore characterized in that the drop of the zero axis frequency below a predetermined value serves as signal for the power failure or for the actuation of the network switch and/or for other control operations. In this connection, the frequency relay determines during normal operation the current of the third and ninth harmonic occurring in the neutral wire, which current is generated by the non-sine-shaped phase voltage of the synchronous motor which voltage, during operation of the synchronous motor, on the network generates a harmonic containing an equalizing current. The zero axis crossings of the voltage drop on the load are counted by the frequency relay and in the frequency relay are compared with the comparative or reference frequency. At the instant of the power failure, the three-phase synchronous motor becomes a generator, and the non-symmetric proportion of the consumer load causes a voltage drop which in view of the now lacking counter voltage of the network consists primarily only of components of the first harmonic. As a result thereof, the number of the neutral axis crossings will, at the instant of a network failure, be subjected to a step function while, for instance with a 50 cycle system, the frequency of 150 cycles measured from the zero axis crossings will drop instantaneously during the power failure down to 50 cycles. This step function serves as signal for the power failure and brings about an opening of the network switch so that the three-phase synchronous motor is separated from the distributing network, and current is fed only into the emergency current consumer load. At the same time, by additional switching operations, a separation of the emergency current consumer load from the remaining network will result as well as a racing of the driving motor for the generator.

According to a further development of the invention it is provided that the frequency relay comprises a quartz element. The frequency of the zero axis crossings is comparable to the natural frequency of the quartz element which natural frequency has been reduced to the frequency of the second harmonic of the network frequency. The zero axis crossings of the voltage drop on the load are thus counted and in the frequency relay are compared with the stepped down (herunter- geteilten) quartz frequency of the second harmonic.

Furthermore, it is suggested that in the feeding-in of the three-phase synchronous motor a one-phase inductive additional load is provided. This additional load may be designed as an air gap choke and will in case of a power failure assure a non-symmetrical fundamental load so that also when no consumer is connected between the test point and the synchronous motor, an unequivocal fundamental wave signal will be conveyed to the frequency relay.

For a load comprising two parallelly arranged oppositely poled zener diodes or break down diodes, a parallel resistance, and a resistor arranged in series between the zener diodes and the parallel resistance, there is furthermore suggested to design the parallel resistance as inductance or as filter. In case of non-symmetries in the fundamental wave system, it is possible with the motor operation of the synchronous motor, which motor or machine can also be operated as generator, to build-up a fundamental wave current component in the neutral wire, which component is superimposed upon the current of the third and ninth harmonic. In order, also in this instance, to arrive at a proper evaluation signal, the parallel resistance is designed as inductance or filter so that the voltage of the third and ninth harmonic dropping thereon will reach three or nine times the voltage drop relative to the component of the fundamental wave.

According to a still further development of the inventon it is suggested that for monitoring a plurality of three-phase synchronous motors, the voltages applied to the exits of the loads are arranged in series and are conveyed to the frequency relay through the remaining end exits. In view of the series arrangement it will be assured that the voltage components of the load voltage, caused by equalizing currents between the synchronous machines, $\pm \Delta U_a$ and $\pm \Delta U_b$ are directed counter to each other so as to cancel each other out in the measuring voltage for the frequency relay.

In contrast thereto, the components of the load voltage $\pm \Delta U_a$ and $\pm \Delta U_b$, caused by currents of the consumers located between the test point and the synchronous machine, are added and thus can be evaluated as fundamental wave signal.

Referring now to the drawings in detail, FIG. 1 shows a high voltage network transformer 1 having connected thereto in the phases a network disconnecting switch 2. Past the disconnecting switch 2, through an emergency current network switch 3, there is a emergency current consumer load 4 placed on the phases. Furthermore, the network is through the intervention of a feed-in 5, in which a network switch 6 is arranged, connected to a three-phase synchronous motor 7. From the feed-in 5, there branches off an emergency current conductor 9 which is controlled by an emergency current generator switch 8 and leads to the emergency current consumer load 4. The three-phase synchronous motor 7 is embodied as reversible motor, which means that, with undisturbed network operation, the three-phase synchronous motor 7 works as motor, for instance on an energy storing device, for instance a flywheel 27 with combustion engine 23 as shown in FIG. 4, and that the motor 7 in response to a power failure operates as generator, through the feed-in 5 and the emergency current conductor 9, feeding current into the emergency consumer load 4. Between the network separating or disconnecting switch 2 and the feed-in 5 there is futhermore arranged a consumer load 10. The three-phase synchronous motor 7 at its neutral conductor or zero wire $M_P$ is provided with a monitor or control device 11. This control device 11 comprises a current converter 12 followed by a load 13 and a frequency relay 14. In the load 13, by means of a parallel resistor 18 designed as resistor, inductance or as filter, there is created a voltage drop. The load 13 additionally comprises a resistor 19 arranged in series and two zener diodes 20 and 21 arranged parallel to the parallel resistor 18. The zener diodes 20 and 21 provide for a limitation or an attenuation of the voltage conveyed to the frequency relay 14, to a value of $\pm \Delta U$. In the frequency relay 14 the comparison or reference frequency is ascertained, for instance by comparison with a reference oscillator triggered by a quartz element. The obtained information is then digitally processed in C-Mos-technique. By means of decoding switches the threshold values can be detected. Furthermore, a one-phase inductive additional load 15 is arranged in the feed-in 5 of the three-phase synchronous machine 7.

Operation—The operation of the monitoring device according to the present invention is as follows. When the networks is undisturbed, an equalizing current, primarily of the third and ninth harmonic flows through the current converter 12. The neutral axis crossings of the voltage drop on the load 13 are counted by the frequency relay 14 and are compared with a reduced quartz frequency in conformity with the second harmonic (with 50 cycle system, 100 cycles). When the neutral axis crossing frequency is higher than the comparison or reference frequency, undisturbed network operation prevails. At the moment a network drop out or power failure occurs, caused for instance by the opening of the network disconnecting switch 2, the three-phase synchronous machine 7 becomes a generator; consequently, at this time, the non-symmetric or unsymmetrical component of current from the consumers, in other words the current of the emergency current consumer load 4, of the consumer load 10 and of the inductive additional load 15, flows through the current converter 12. As a result thereof, a voltage drop is created on the load 13 which drop, due to the now lacking counter voltage of the network, consists primarily only of the components of the first harmonic. Consequently there occurs a step function in the number of neutral axis crossings, for instance with a 50 cycle system a step-like reduction of the measured frequency of 150 cycles to 50 cycles. Thereupon, due to the response of the control device 11, the frequency relay 14 registers a difference as to the comparison frequency so that by way of the control line 22 in FIG. 4, the network switch 6 and the emergency current network switch 3 are opened and the switch 8 is closed and a starting equipment 24 effects a starting of the combustion engine 23 as to the flywheel 27 by way of a coupling 25, so that the three-phase synchronous machine 7 feeds through the emergency current conductor 9 into the emergency current consumer load 4.

If at the instant of the power failure signaled by an indicator device 26, the sum of the consumer loads of the emergency current consumer load 4 and the consumer load 10 equals zero, the current in the neutral wire is determined by the one-phase inductive additional load 15 so that a response of the control or monitoring device 11 will be assured in this way. For obtaining an unequivocal evaluable signal when non-symmetries prevail in the fundamental wave system, the parallel resistor 18 of the load 13 can be designed as inductance or filter so that the voltage U of the third and ninth harmonic which drops on the parallel resistor 18 will reach three or nine times the voltage drop with regard to the component of the fundamental wave.

Figure 2:
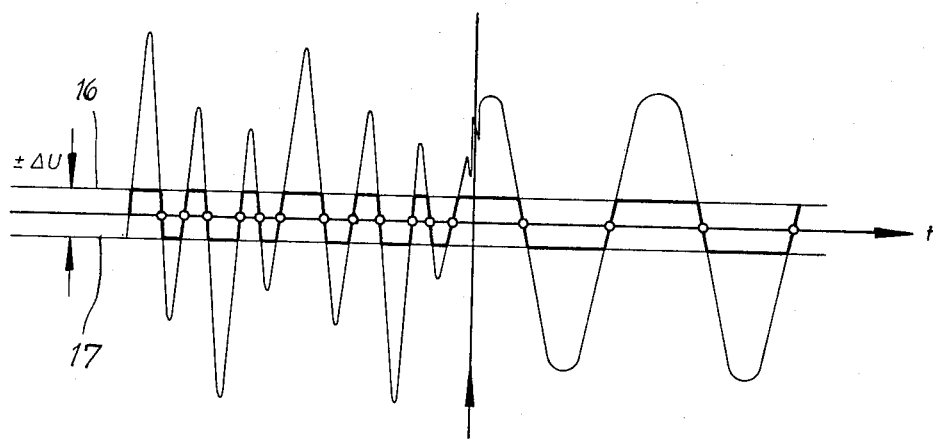
FIG. 2 is an oscillogram of the primary current of the $M_P$-current converter during the power failure.

FIG. 2 shows the course of an oscillogram of the primary and secondary current of the $M_P$-current converter 12 during the transition from normal operation to the operation at a power failure. The course of the voltage $\pm \Delta U$ on the frequency relay 14 is defined by the straight lines 16 and 17 extending parallel to the abscissa. From this diagram it can be clearly seen that the number of the zero axis crossings will, at the instant of a power failure, be subjected to a step function.

Figure 3:
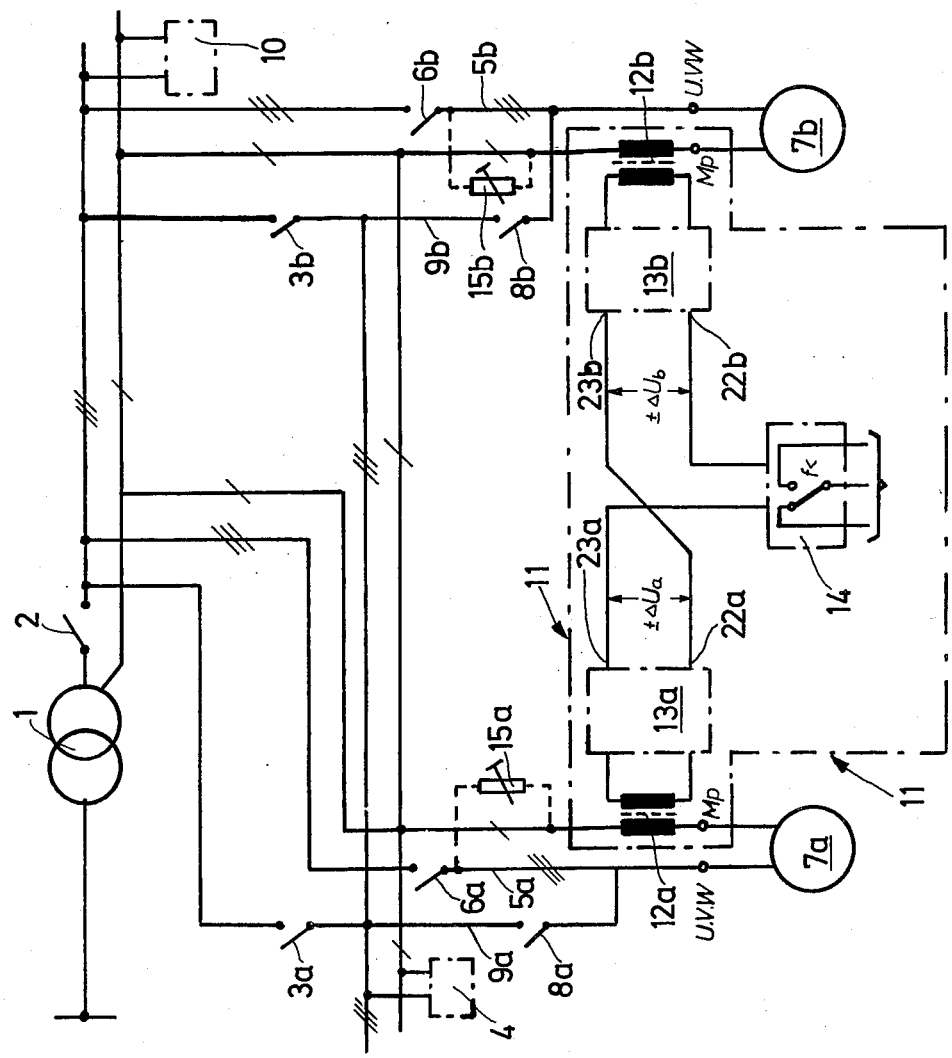
FIG. 3 shows an arrangement for monitoring a current network with parallel operation of two synchronous motors.

FIG. 3 shows an arrangement for monitoring a current network in which the current network is connected to two parallel operated three-phase synchronous machines 7a and 7b. Corresponding to FIG. 1, the structural elements, namely high voltage network transformer 1, network disconnecting switch 2, emergency current consumer load 4, and consumer load 10 are designed in conformity with FIG. 1. On the other hand, for each three-phase synchronous motor or machine 7a and 7b there are respectively provided elements 3a and 5a to 9a and 3b and 5b to 9b, these elements being identical to the corresponding elements of FIG. 1. Furthermore, the three-phase synchronous motors 7a and 7b have a monitoring device 11 in their neutral conductor $M_P$ which device 11 for each three-phase synchronous motor 7a and 7b comprises a current converter 12a and 12b with a next following load 13a and 13b and a common frequency relay 14. In this connection, the exit 22a of the load 13a and the exit 23b of the load 13b are interconnected, whereas the remaining end exits 23a and 22b of the loads 13a and 13b are connected to the frequency relay 14.

In view of this arrangement of the loads or burdens 13a and 13b, in connection with the frequency relay 14, the result will be obtained that the voltage components of the burden voltage $\pm \Delta U_a$ and $\pm \Delta U_b$ which components are created by the equalizing currents between the synchronous machines 7a and 7b, are arranged counter to each other so that in the measuring voltage for the frequency relay they cancel each other out. In contrast thereto, the components of the burden voltage $\pm \Delta U_a$ and $\pm \Delta U_b$, which are created by the currents of the consumer load 10 and the additional loads 15a and 15b located between the master switch 2 and the synchronous machines 7a and 7b, are added up and thus can after a power failure be evaluated as fundamental wave signal. When the zero axis crossings differ from the reference frequency on the frequency relay 14, the network switches 6a, 6b and the emergency current network switches 3a, and 3b are opened and the emergency current generator switches 8a and 8b are closed so that the three-phase synchronous machines 7a and 7b only feed into the emergency current consumer load 4. For more than two generators, arrangements can be built up in conformity with the principle set forth above.

It is, of course, to be understood that the present invention is, by no means, limited to the specific showing in the drawings but also comprises any modifications within the scope of the appended claims.

What is claimed is:

1. An arrangement for monitoring an electric current network, which includes: at least one three-phase synchronous machine connectable to the electric network to be monitored and provided with a neutral wire, an installation comprising energy storage means operable instantaneously and arranged in operative connection with said synchronous machine, a monitoring device arranged between the neutral point of said at least one synchronous machine and the neutral wire of the network, said monitoring device comprising an $M_P$ current converter and a load burden means serially arranged with regard to each other and a frequency relay for ascertaining the zero axis crossings of the dropping voltage on said load burden means, and switch means associated with said network, said drop of said zero axis crossing frequency below a pre-set value being operable to emit a signal for the power failure of said network.

2. An arrangement according to claim 1, in which said network comprises a master switch movable into on- and off-position, and in which said drop of said zero axis crossing frequency is operable to emit a signal to bring about movement of said master switch to its off-position.

3. An arrangement according to claim 1, in which said frequency relay includes a quartz element having a natural frequency reduced to the second harmonic of the electric network to be monitored, the frequency of said zero axis crossings being comparable with said natural frequency.

4. An arrangement according to claim 1, which includes a one-phase inductive additional load arranged in the feed-in of said three-phase synchronous machine.

5. An arrangement according to claim 4, in which said inductive additional load is an air gap choke.

6. An arrangement according to claim 1, in which said burden comprises two parallel arranged oppositely poled Zener diodes and a parallel resistor and a resistor arranged in series between said Zener diodes and said parallel resistor, said parallel resistor forming an inductance.

7. An arrangement according to claim 1, in which said load burden means comprises two parallel arranged oppositely poled Zener diodes and a parallel resistor and a resistor arranged in series between said Zener diodes and said parallel resistor, said parallel resistor being formed by a filter.

8. An arrangement according to claim 1, which includes a plurality of three-phase synchronous machines, and in which the exits of said load burden means are arranged in series while the end exits are connected to said frequency relay.

* * * * *